UNITED STATES PATENT OFFICE.

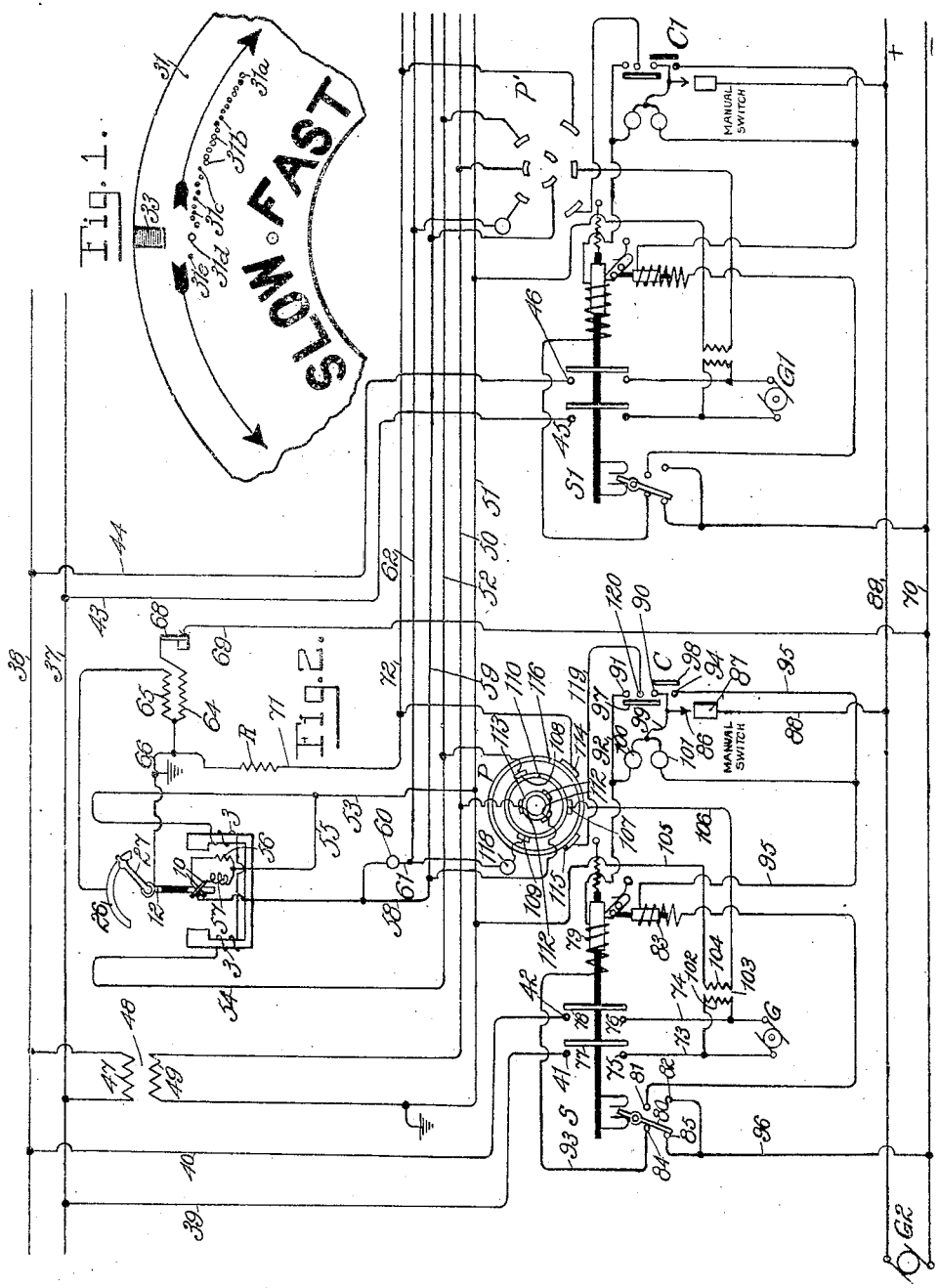

EDMUND O. SCHWEITZER, OF CHICAGO, ILLINOIS.

SYSTEM OF OPERATION FOR SYNCHRONIZING RECORDERS.

1,030,925.  Specification of Letters Patent.  Patented July 2, 1912.

Application filed December 10, 1910.  Serial No. 596,613.

*To all whom it may concern:*

Be it known that I, EDMUND O. SCHWEITZER, a citizen of the United States, residing at Chicago, in the county of Cook and State of Illinois, have invented a certain new and useful Improvement in Systems of Operation for Synchronizing Recorders, of which the following is a full, clear, concise, and exact description, reference being had to the accompanying drawings, forming a part of this specification.

My invention consists in an improved system of operation of alternating current generators by which they may be accurately connected in parallel with each other in proper phase relation. Heretofore various methods have been employed for synchronizing such generators and indicating such synchronous relation, but as far as I am aware no means has been employed heretofore for recording the phase relation of the alternating electromotive forces to be connected together.

By my invention I prefer to employ a set of main bus bars, a set of synchronizing bus bars and direct current bus bars available in connection with any alternating current generator to be connected to the main bus bars so that the switch controlling mechanism and the phase recorder may be controlled from a position on a switchboard corresponding to the particular generator to be connected. In connecting any generator to the main bus bars a synchronizing plug is first inserted in a socket corresponding to the machine to be connected, which serves to connect potential leads from the main bus bars and the generator to be connected, to the phase recorder. This phase recorder by its operation serves also to indicate the phase relation at any instant and it may therefore be called a recording synchronizer. With the recording synchronizer connected as described, when a synchronous relation is indicated between the electromotive forces of the main bus bars and the generator to be connected, a control switch associated with such generator is operated and by its operation serves to establish connection between the terminals of the generator and the main bus bars and also to operate the recording mechanism, thus making a record of the difference in phase between the two electromotive forces at the instant of operation of the control switch.

A further result secured by my invention is the making of a record which indicates in connection with a high tension system the instant of closure of the control switch and also the instant of closure of the high tension switch, thus giving a means for checking any irregularity of operation of the high tension switch.

While my synchronizing recorder is particularly adapted for the purpose outlined above, it will appear that it may be used also for the purpose of recording any phase difference between two alternating electromotive forces as desired and thus preserving a record of such phase difference from instant to instant whether in connection with the practical operation of alternating current machinery or in experimental work.

The recording synchronizer employed consists essentially of two members movable relatively to each other in proportion to the phase difference between the alternating electromotive forces to be compared and an electrode carried by one of such members in such a manner as to correspondingly displace it from a given reference point and devices for causing the passage of an electric spark or sparks from such electrode through a record disk at the desired instant. The record disk is provided with a mark or indication corresponding to the reference position of the movable electrode from which the puncture caused by the passage of the electric spark or sparks affords a visible indication and permanent record of the angle of phase difference between the compared electromotive forces at the instant of making the record.

The several drawings illustrating my invention are as follows:

Figure 1 is a view of a portion of a record made by the recorder; Fig. 2 is a diagrammatic circuit drawing of the recording synchronizer, connections and apparatus employed for connecting two or more alternating current generators in parallel relation.

Each record disk, for convenience, bears the designations "Slow" and "Fast", as shown in Fig. 1 together with arrows indicating the direction of motion of the pointer 27 shown in Fig. 2 which will result when the periodicity of the electromotive force connected with the field windings of the recorder is either slower or faster than the periodicity of the electromotive force with which it is being compared.

In using an induction coil for making a record the primary circuit is closed at the instant at which a record of the phase difference between the electromotive forces is desired, and as a result an electric spark passes between the pointer 27 and the ring 26 through the record disk 31, thereby puncturing such disk and giving an angular indication of the phase relation. If the primary circuit of the induction coil remains closed, the record produced will be a succession of punctures separated by a distance corresponding to the time interval of the make-and-break apparatus of the induction coil.

In using my synchronizing recorder for making a record of the phase difference between alternating electromotive forces in connection with coupling the generators producing such electromotive forces for parallel working, circuit connections indicated in Fig. 2 may be employed to advantage. As shown in this figure, the main bus bars 37 and 38 are employed, from which conductors 39 and 40 extend to the contacts 41 and 42 of a main switch adapted to connect with such conductors the alternating current generator G. The main bus bars 37 and 38 have also connected with them conductors 43 and 44 extending to contacts 45 and 46 of a main switch adapted by its operation to connect with such conductors the alternating current generator G¹. The main bus bars 37 and 38 have also connected with them the primary winding 47 of the potential transformer 48, the secondary winding 49 of which is connected with the synchronizing bus bars 50 and 51. The field coils 3 of the recording synchronizer are connected with the synchronizing bus bars 51 and 52, respectively, by wires 53 and 54. The wire 53 is connected by wire 55 with the common terminal of a non-inductive resistance 56 and an inductive resistance 57, the other terminals of which are connected with the two armature windings 10, the other terminals of these armature windings being connected together and by wire 58 with synchronizing bus bar 59. The wire 58 has connected therewith a synchronizing lamp 60, the other terminal of which is connected by wire 61 with synchronizing bus bar 62.

An induction coil 63 provided with a primary winding 64 and secondary winding 65 is provided in connection with the recording synchronizer to make the record as described above. The common terminal of the primary and secondary windings is connected by wire 66 with the shaft 12 and thus to the pointer 27, while the other terminal of the secondary winding 65 is connected by wire 67 with the ring 26. The wire 66 is preferably grounded as indicated. The other terminal of the primary winding 64 is connected with the vibrator 68, the contact of which is connected by wire 69 with a direct current bus bar 70 supplied with current from a suitable source as the generator G². The wire 66 is connected through a resistance R by wire 71 with synchronizing bus bar 72.

The generator G is connected by conductors 73 and 74 with the contacts 75 and 76 of the main switch S. Contact bars 77 and 78 are so disposed relatively to the main contacts of the switch S that when actuated by the closing coil 79 they are moved to connect the contacts 41 and 75 and the contacts 42 and 76, respectively, and after such operation the operating mechanism of the switch serves to move the contact bar 80 so as to connect the contacts 81 and 82. The closing of the main contacts described is done against the tension of a spring which serves upon the energization of the tripping coil 83 to move the connecting bars 77 and 78 to their open position indicated in Fig. 9 and to also move the connecting bar 80 from the contacts 81 and 82 to the contacts 84 and 85, as indicated in Fig. 2. A control switch C is provided in connection with the generator G to actuate the main switch S. The switch C is provided with a pair of contacts 86 and 87, which may be closed or opened for any position of the control switch C. The contact 87 is connected by wire 88 with one of the bus bars 89 connected with the direct current generator G², the other contact 86 being connected with the contact 90 of the switch C. The contact 91 of the switch C is connected by wire 92 with one terminal of the closing coil 79 of the switch S; the other terminal of such coil being connected by wire 93 with contact 84. The contact 94 of the control switch C is connected by wire 95 with one terminal of the tripping coil 83 of the main switch S, the other terminal of which is connected with the contact 81. The contacts 82 and 85 of the main switch S are connected together and are connected by wire 96 with the direct current bus bar 70. The control switch is provided with a contact bar 97 adapted to connect the contacts 90 and 91 when the switch is moved to one position and a second contact bar 98 adapted to connect the contacts 90 and 94 when the switch is moved to its opposite position, such positions serving respectively to close and trip the main switch S. The contact 86 is also connected by wire 99 with the common terminal of lamps 100 and 101, the other terminals of which are connected respectively with wires 92 and 95.

The wires 73 and 74 extending from the generator G are connected with the primary winding 102 of a voltage transformer 103, the secondary winding 104 of which is connected by wires 105 and 106 with the synchronizing bus bar 51 and contact 107 of a synchronizing plug switch P associated with the control switch C. The plug switch P consists of three sets of contacts, each set adapted to be independently engaged by conducting rings. One set of contacts 107, 108 and 109 is adapted to be connected together by a connecting ring 110. A second set 111, 112 is adapted to be connected together by a connecting ring 113, while a third set of contacts 114 and 115 is adapted to be connected together by a ring 116. The rings 110, 113 and 116 are mounted upon an insulating plunger and operated by means of a suitable handle connected therewith.

The contact 108 of the switch P is connected with the synchronizing bus bar 52. The contact 109 is connected through the pilot lamp 118 with the synchronizing bus bar 62. The contacts 111, 112 and 114 are connected, respectively, with the synchronizing bus bars 59, 50 and 72. Contact 115 is connected by wire 119 with contact 120 of the switch C adapted to be connected with the contact 90 by the connecting bar 97 when the latter is moved to connect the contact 90 with the contact 91.

The generator $G^1$ is provided with a main switch $S^1$, a control switch $C^1$ and a synchronizing plug switch $P^1$ similar to the switches S, C and P above described and similarly connected to the main bus bars, the synchronizing bus bars and the direct current bus bars. In connecting any generator with the bus bars 37 and 38 the plug of the synchronizing switch P is first inserted which, as above described, connects the contacts 111 and 112, the contacts 107, 108 and 109 and the contacts 114, and 115. For this condition the potential transformers 48 and 103 are connected with the windings of the synchronizing recorder as follows: common ground terminal, secondary winding 49, bus bar 50, contact 112, contact 111, bus bar 59, wire 58, windings of armature 10 through the resistances 56 and 57 to wire 55, wire 53, bus bar 51, back to ground. A circuit is closed from the transformer 103 as follows: winding 104, wire 106, contact 107, contact 108, bus bar 52, wire 54, field coils 3, wire 53, bus bar 51, wire 105, back to winding 104. The two windings of the armature 10 are disposed at right angles to each other and the non-inductive resistance 56 and the inductive resistance 57 are so proportioned as to displace the currents flowing in the two windings by practically 90 degrees, as a result of which a rotary field is produced in the armature to effectively cause rotation of such armature and the parts carried thereby. As a result of the circuits thus closed the moving mechanism of the recorder is energized and the pointer 27 is caused to rotate at a rate corresponding to the difference in frequency between the electromotive forces delivered by the windings 49 and 104, assuming that an alternating electromotive force is at this time impressed upon the main bus bars 37 and 38. The plug in the synchronizing switch P at this time also connects the lamp 118, through the wire 61, with the lamp 60, and the two lamps thus connected in series are connected between the wires 58 and 106, as a result of which the lamps 60 and 118 serve as pilot lamps to indicate the phase relation between the electromotive forces delivered by the windings 49 and 104. The insertion of the plug in the synchronizing switch P also serves by the connection of the contacts 114 and 115 to connect the primary winding 64 of the induction coil with the contact 120 of the control-switch C.

For the condition of the apparatus described the operation of the pointer 27 is an indication to the attendant of the regulation which must be made in the generator G to bring the electromotive force from the transformer 104 into phase with the electromotive force delivered from the transformer 48, and when this result is accomplished he operates the control-switch C. The operating mechanism of this switch is so constructed as to first close the contacts 86 and 87 after which the connecting-bar 97 is moved into engagement with the contacts 90, 91 and 120. As a result circuits are closed as follows: generator $G^2$, bus-bar 89, wire 88, contact 87, contact 86, contact 90, connecting-bar 97, contact 91, closing coil 79, wire 93, contact 84, connecting-bar 80, contact 85, wire 96, bus-bar 70, back to generator $G^2$. At this time a circuit is closed in parallel with the circuit above traced, as follows: contact 86, contact 90, connecting-bar 97, contact 120, wire 119, contact 115, contact 114, wire 71, resistance R, primary winding 64, interrupter mechanism 68, wire 69, bus-bar 70, back to generator $G^2$. As a result of the circuit last traced the induction coil 63 is placed in operation, and at the same instant electric sparks are projected between the pointer and the ring 26, through the following circuit: secondary winding 65, wire 67, ring 26, pointer 27, wire 66, back to the secondary winding 65. It is understood that before operating the control-switch C, the record disk 31 was properly placed upon the recorder and therefore the passage of the sparks just described perforates the disk and indicates the position of the pointer on the disk at the instant of closure of control-switch C, and by the punctures in the disk subsequently made the direction of motion of the pointer is indicated as well as its rate of motion assuming that the rate of operation of the interrupter mechanism 68 is known.

The energization of the coil 79 moves the connecting-bars 77 and 78 to a position to connect the contact 41 with the contact 75, and the contact 42 with the contact 76, and at the time of the closure of these connections to move the connecting-bar 80 from the contact 84 to connect the contact 81 with the contact 82. For this condition the generator G is connected to the main bus-bars 37 and 38 as follows: bus-bar 37, wire 39, contact 41, connecting-bar 77, contact 75, wire 73, generator G, wire 74, contact 76, connecting-bar 78, contact 42, wire 40, to bus-bar 38. The connection of the contacts 81 and 82 by the connecting-bar 80 serves to light the lamp 101 over the following circuit: generator $G^2$, bus-bar 89, wire 88, contact 87, contact 86, wire 99, lamp 101, wire 95, trip coil 83, contact 81, connecting-bar 80, contact 82, wire 96, bus-bar 70, back to generator $G^2$. As result of the circuit just traced, the lamp 101 is lighted indicating that the main switch S has been properly operated to close the circuit from the generator G to the main bus-bars 37 and 38; the current flowing at this time through the trip-coil 83 is insufficient to operate the tripping mechanism of the main switch 37 on account of the resistance of the lamp 101.

It is to be observed that upon the closure of the control-switch C before the main switch S has operated, that a considerable current flows from the generator $G^2$ through the control-switch, since at this time the closing coil 79 and the induction coil 63 are both in operation. When the main switch S has operated, the circuit of the closing coil 79 is opened thus causing a change in the current flow through the circuits connected with the bus-bars 70 and 89 and this changed relation causes a difference in the character of operation of the induction coil 63 and a corresponding change in the nature of the record produced. This is illustrated in Fig. 6 which shows a portion of a record made in the manner described above. As shown in this figure the puncture $31^a$ indicates the position of the pointer and therefore the phase difference between the electro-motive forces when the control-switch was closed and the punctures $31^b$ indicate the period during which the control-switch was closed before the operation of the main switch. Upon the operation of the main switch the punctures $31^c$ were produced of different character than the punctures $31^b$ indicating definitely the point at which the main switch closed. The comparatively large puncture $31^d$ made at the synchronous position indicates the passage of successive sparks between the pointer and conducting ring as a result of the generator G being held in synchronous relation by its connection with the main bus-bars 37 and 38. The puncture $31^e$ indicates that as a result of the retarding effect upon the generator G of the potential upon the main bus-bars 37 and 38 the generator G was made to run slightly too slow for which condition the puncture $31^e$ was made and that subsequently the speed of the generator was increased very slightly to bring it back to exactly synchronous relation.

After the attendant has an indication from the lamp 101 that the main switch S has properly operated, he moves the operating mechanism of the control-switch C to a position to open the contacts 86 and 87, and if desired to move the connecting bar 97 to a neutral position so that the contacts of the control-switch are entirely disconnected. When it is desired to disconnect the generator G from the main bus-bars 37 and 38 the control-switch C is operated so as to close the contacts 86 and 87 and move the connecting-bar 98 into engagement with the contacts 90 and 94, for which condition the lamp 101 is short-circuited through the connecting-bar 98 and wires 99 and 95, while the circuit through the lamp 100 is open due to the disconnection of the contact 84 from the wire 96. For this condition the trip-coil 83 is energized over the following circuit: generator $G^2$, bus-bar 89, wire 88, contact 87, contact 86, contact 90, connecting-bar 98, contact 94, wire 95, tripping-coil 83, contact 81, connecting-bar 80, contact 82, wire 96, bus-bar 70, back to generator $G^2$. The coil 83 is thus energized and releases the spring mechanism of the main switch S which moves the connecting-bars 77 and 78 to a position to disconnect the generator G from the bus-bars 37 and 38 and also to move the connecting-bar 80 from the contact 81 to the contact 84 to establish a circuit through the lamp 100 as follows: generator $G^2$, bus-bar 89, wire 88, contact 87, contact 86, wire 99, lamp 100, closing-coil 79, wire 93, contact 84, connecting-bar 80, contact 85, wire 96, bus-bar 70, back to generator $G^2$. The lamp 100 is thus lighted, while the closing-coil is not energized owing to the resistance of such lamp and the indication afforded by the lamp shows that the main switch S has been properly opened.

The generator $G^1$, as described above, is provided with a synchronizing plug switch, a control-switch, and a main switch, and also with a voltage transformer similar to those described in connection with the generator G, and the connections of this apparatus and the various bus-bars are similar to those described above, from which it will be seen that the insertion of any synchronizing plug connects the voltage transformer with the corresponding generator, and also the voltage transformer 48, connected with the main bus-bars 37 and 38, with the recording synchronizer to cause the operation of its moving parts, for which condition the pilot lamp 118 associated with the particular synchronizing plug switch P¹ which is operated serves in conjunction with the pilot lamp 60 associated with the recording synchronizer to indicate roughly the phase relation between the electro-motive forces of the generator to be connected and of the main bus-bars 37 and 38. Similarly the operation of the control-switch C¹ of any generator to be connected serves through the bus-bar connected with the induction coil 63 to cause the operation of such induction coil and therefore the making of a record by the recording synchronizer.

It is to be understood that as many generators as desired may be connected with the bus-bars, the connections of the generator G¹ being identical with those made for each of such generators.

It will be apparent from the description above that if no source of alternating current is connected with the main bus-bars 37 and 38 initially, the generator G may be at once connected with such bus-bars if desired, by the operation of the control switch C as there is nothing with which to compare the electro-motive force delivered by the generator G. Having thus connected the generator G, the generator G¹ may be connected in parallel therewith by operating the various switching means, as above described.

The arrangement particularly shown in the drawings is intended for use in connection with large or high tension units, where the direct manual operation of the main switch would be arduous or dangerous. In systems employing small or low tension units, the main switch could obviously be operated directly by hand, in which case the control-switch would be dispensed with. Such an elimination of the control-switch would involve some modification of the circuits herein particularly described without, however, sacrificing the possibility of using the fundamental features of my invention.

From the above it will appear that my improved recording synchronizer provides a very convenient means for accomplishing the proper connection of alternating current generators for parallel working; that such recorder may be used in any connection in which it is desired to record the phase difference between alternating electro-motive forces regardless of the source of such electro-motive forces and regardless also of whether they are to be connected together or not, and thus a means is provided for the recording at any desired instant of such phase difference by the closure of switching means at that instant to operate the recording mechanism of my device.

While I have shown my invention in the particular embodiment herein disclosed, I do not, however, limit myself to these constructions, but desire to claim any equivalent that might suggest itself to those skilled in the art.

What I claim is:

1. In combination, two sources of alternating current potential, a synchronism indicator connected with the two sources of alternating current potential to indicate the phase relation of the two alternating potentials, normally inactive recording mechanism associated with the synchronism indicator, switching mechanism adapted upon actuation to connect the two sources of alternating current potential in parallel, and means operatively associated with said switching mechanism and serving automatically upon the actuation of said switching mechanism to put said recording mechanism in operation.

2. In combination, two sources of alternating current potential, a synchronism indicator connected with the two sources of alternating current potential to indicate the phase relation of the two alternating potentials, normally inactive recording mechanism associated with the synchronism indicator, power-operated main switching mechanism adapted upon actuation to interconnect the two sources of alternating current potential, a manually operable switch controlling the application of power to the main switching mechanism, and means associated with the manually operable switch serving automatically upon the actuation of said manually operable switch to put said recording mechanism in operation.

3. In combination, two sources of alternating current potential, a synchronism indicator connected with the two sources of alternating current potential to indicate the phase relation of the two alternating potentials, normally inactive recording mechanism associated with the synchronism indicator, main switching mechanism adapted upon actuation to connect the two sources of alternating current potential in parallel, a control switch controlling the actuation of the main switching mechanism, means associated with the control-switch serving automatically upon the actuation of said control-switch to put said recording mechanism in operation, and means associated with said main switching mechanism serving automatically upon the actuation of said main switching mechanism to modify the operation of said recording mechanism to modify the character of the record from and after the actuation of the main switching mechanism.

4. In combination, two sources of alternating current potential, a synchronism indicator connected with the two sources of alternating current potential to indicate the phase relation of the two alternating potentials, normally inactive recording mechanism associated with the synchronism indicator, main switching mechanism adapted upon actuation to interconnect the two sources of alternating current potential, electro-magnetic mechanism for actuating said main switching mechanism, a control-switch controlling the energization of the electro-magnetic actuating mechanism of the main switching mechanism, and means associated with the control-switch serving automatically upon the actuation of said control-switch to put said recording mechanism in operation.

5. In combination, two sources of alternating current potential, a synchronism indicator connected with the two sources of alternating current potential to indicate the phase relation of the two alernating potentials, normally inactive recording mechanism associated with the synchronism indicator, main switching mechanism adapted upon actuation to connect the two sources of alternating current potential in parallel, a control-switch controlling the actuation of the main switching mechanism, means associated with the control-switch serving automatically upon the actuation of said control-switch to put said recording mechanism in operation to produce a record, and means associated with said main switching mechanism serving automatically upon the actuation of said main switching mechanism to put said recording mechanism in operation to produce a distinctive record from and after the actuation of said main switching mechanism.

In witness whereof, I hereunto subscribe my name this 5th day of December, A. D. 1910.

EDMUND O. SCHWEITZER.

Witnesses:
ROBERT D. TURGEON,
EMIL W. STUGE.